United States Patent
Trnkus et al.

(10) Patent No.: US 8,818,198 B2
(45) Date of Patent: Aug. 26, 2014

(54) PHOTONIC LINK INFORMATION COLLECTION AND ADVERTISEMENT SYSTEMS AND METHODS

(75) Inventors: Marian Trnkus, Chevy Chase, MD (US); Loudon T. Blair, Severna Park, MD (US); Lyndon Y. Ong, Sunnyvale, CA (US); Anurag Prakash, Noida (IN); Mohit Chhillar, Delhi (IN)

(73) Assignee: Ciena Corporation, Hanover, MD (US)

(*) Notice: Subject to any disclaimer, the term of this patent is extended or adjusted under 35 U.S.C. 154(b) by 198 days.

(21) Appl. No.: 13/399,276

(22) Filed: Feb. 17, 2012

(65) Prior Publication Data

US 2013/0177311 A1 Jul. 11, 2013

(30) Foreign Application Priority Data

Jan. 5, 2012 (IN) .............................. 43/DEL/2012

(51) Int. Cl.
    H04B 10/00 (2013.01)
(52) U.S. Cl.
    USPC .......................................... 398/141; 398/113
(58) Field of Classification Search
    USPC ................. 398/25, 45, 141, 173, 177
    See application file for complete search history.

(56) References Cited

U.S. PATENT DOCUMENTS

| | | | |
|---|---|---|---|
| 7,437,449 B1 | 10/2008 | Monga et al. | |
| 7,983,558 B1 | 7/2011 | Gerstel et al. | |
| 8,391,168 B2 * | 3/2013 | Jiang et al. ................... | 370/252 |
| 8,488,963 B2 * | 7/2013 | Kunjidhapatham et al. .... | 398/57 |
| 2004/0008988 A1 * | 1/2004 | Gerstal et al. ................... | 398/45 |
| 2007/0019954 A1 * | 1/2007 | Lu et al. ......................... | 398/51 |
| 2009/0080886 A1 | 3/2009 | Lee et al. | |
| 2009/0110395 A1 | 4/2009 | Lee et al. | |
| 2009/0116837 A1 | 5/2009 | Boertjes et al. | |
| 2009/0190497 A1 | 7/2009 | Peloso et al. | |
| 2009/0324222 A1 * | 12/2009 | Kunjidhapatham et al. .... | 398/58 |
| 2010/0129078 A1 | 5/2010 | Weston-Dawkes et al. | |
| 2010/0142943 A1 | 6/2010 | Frankel et al. | |
| 2010/0247096 A1 | 9/2010 | Emery et al. | |
| 2011/0013908 A1 | 1/2011 | Gazzola et al. | |
| 2011/0052190 A1 * | 3/2011 | Lu et al. ......................... | 398/43 |
| 2011/0262142 A1 * | 10/2011 | Archambault .................. | 398/83 |
| 2013/0177311 A1 * | 7/2013 | Trnkus et al. ................... | 398/28 |

* cited by examiner

*Primary Examiner* — Agustin Bello
(74) *Attorney, Agent, or Firm* — Clements Bernard PLLC; Christopher L. Bernard; Lawrence A. Baratta, Jr.

(57) ABSTRACT

Photonic link information collection and advertisement systems and methods enable photonic nodes (e.g., optical amplifiers) to operate within a control plane system in a distributed and real-time manner. For example, the photonic nodes may not require full control plane protocol stacks at each photonic node. In particular, the systems and methods provide a distributed discovery method for photonic links without requiring full participation in the control plane at the photonic nodes. Additionally, the systems and methods include network databases with amplifier configuration information in a control plane enabled network.

20 Claims, 6 Drawing Sheets

PHOTONIC LINK INFORMATION COLLECTION AND ADVERTISEMENT SYSTEMS AND METHODS

CROSS-REFERENCE TO RELATED APPLICATION(S)

The present non-provisional patent claims the benefit of priority of Indian Patent Application No. 43/DEL/2012, filed on Jan. 5, 2012, and entitled "PHOTONIC LINK INFORMATION COLLECTION AND ADVERTISEMENT SYSTEMS AND METHODS," the contents of which are incorporated in full by reference herein.

FIELD OF THE INVENTION

The present disclosure relates generally to optical networking systems and methods. More particularly, the present disclosure relates to photonic link information collection and advertisement systems and methods that enable photonic nodes (e.g., optical amplifiers) to operate within a control plane system in a distributed and real-time manner.

BACKGROUND OF THE INVENTION

Optical networks and the like are deploying control plane systems and methods that span multiple layers (e.g., wavelength division multiplex (WDM), Synchronous Optical Network (SONET), Synchronous Digital Hierarchy (SDH), Optical Transport Network (OTN), Ethernet, and the like). Control plane systems and methods provide automatic allocation of network resources in an end-to-end manner. Exemplary control planes may include Automatically Switched Optical Network (ASON) as defined in G.8080/Y.1304, Architecture for the automatically switched optical network (ASON) (February 2005); Generalized Multi-Protocol Label Switching (GMPLS) Architecture as defined in Request for Comments (RFC): 3945 (October 2004) and the like; Optical Signaling and Routing Protocol (OSRP) from Ciena Corporation of Linthicum, Md. which is an optical signaling and routing protocol similar to PNNI (Private Network-to-Network Interface) and MPLS; or any other type control plane for controlling network elements at multiple layers, and establishing connections therebetween. Control plane systems and methods use link management protocol(s) to discover peers on topological links. These protocols exchange information over a dedicated and well known communication channel with peers on opposite ends of the communication link. Communication exchange establishes peer adjacency, type, capacity, and the like of topological link between peers. Topological link information is then advertised to all nodes that perform path computation in the network.

In a digital networks (e.g., SONET, SDH, OTN, etc.), understanding network topology and capacity on each topological link provides a basis for path computation. However, due to the analog nature of a photonic network, path computation in the photonic network requires additional information identifying photonic attributes of each link which are necessary for computation of optical reach. In conventional photonic networks, photonic information is collected via a Network Management System (NMS), Element Management System (EMS), or the like, using a centralized method of data collection from the network. Centralized collection of photonic network layer information from photonics links requires that the NMS, EMS, etc. collect the information from each node individually. This means that an NMS, EMS, etc. is required in networks managed by a distributed control plane. Disadvantageously, such data collection is typically time consuming and involves off-line computation algorithms. Hence, these conventional methods are in conflict with real-time nature of control planes, and implies a longer overall system response time to changes in network topology. In most cases, network updates via the NMS, EMS, a planning system, etc. require that an operator or planner gets involved.

While control plane standard bodies describe protocols for control plane signaling and routing and a path computation device, they do not address how photonic data should be collected and distributed in the control plane. For example, a conventional GMPLS networks discover network topology, but not photonic layer attributes. Without photonic layer attributes, a path computation algorithm cannot compute and validate wavelength reach. Without knowing amplifier type, fiber types, amplifier gains settings, power levels, and others, the algorithm may only work from pre-computed tables or manually entered data, and will not be able to accurately compute reach since it will be lacking enough input parameters. Without distributed photonic data collection and distribution, a Path Computation Element (PCE) has to use a centralized photonic layer data collection described above.

Unique to photonic networks, the photonic network layer includes various optical components such as optical amplifiers, and the configuration of the optical amplifiers is typically fixed, i.e. it has a fixed set of inputs and outputs and a fixed set of connections therebetween. Hence, from the perspective of the control plane, the optical amplifier nodes are irrelevant since they do not provide flexible switching at a data plane layer. However, the Optical Multiplex Section (OMS) and Optical Transmission Section (OTS) relationship is relevant in order to understand shared risk link information. Note, OMS and OTS are photonic layers defined in Optical Transport Network (OTN) such as in ITU Recommendations G.872, G.707, G.798, G.9591, and G.874, the contents of each are incorporated by reference herein. In a GMPLS network, the GMPLS network discovers links to neighbors. In a photonic network, each amplifier terminates an OTS link, and hence each optical amplifier then needs to discover neighbors and advertise these links to the rest of the network. Hence, in a conventional GMPLS network, each optical amplifier has to run a full protocol stack, and have enough processor performance and memory to hold topology for the entire network.

Disadvantageously, placing a full control plane stack at each optical amplifier has two side effects. First, a large number of network nodes inhibits scaling. For example, an OMS link may have up to 30 or more optical amplifiers. If each optical amplifier is a control plane node, the total number of nodes in the network goes up by an order of 10 or more. Such a large number of network nodes has a very large impact of network scalability, mainly impacting the scalability of network flooding. Secondly, each amplifier control processor has to be capable of holding full network database. Thus, as the network and the network's associated meshing of nodes grows, memory and processor performance requirements grow exponentially.

BRIEF SUMMARY OF THE INVENTION

In an exemplary embodiment, a network includes a plurality of network elements operating a control plane therebetween; a plurality of links interconnecting the plurality of network elements; and at least one optical amplifier disposed on at least one of the plurality of links; wherein each of the at least one optical amplifier is configured with a photonic link discovery task, the photonic link discovery task is configured to provide photonic layer data for the at least one optical amplifier and associated links to the control plane. The network may further include network databases at each of the plurality of network elements, wherein the network databases may include amplifier configuration information received from the control plane in addition to topological data; wherein the amplifier configuration information is applied to path computation providing performance estimates of paths in the network. The photonic link discovery task may be configured to collect information in a single sequence for a fiber, Optical Multiplex Sections, and Optical Transmission Sections for each of the at least one of the plurality of links. The information may include hierarchical shared link risk information, and wherein the information may be input to one of t planning system and a path computation system. The information may include any of amplifier type, fiber types, amplifier gains settings, and power levels, and wherein the one of the planning system and the path computation system may be configured to compute a path and associated wavelengths in the network based on the information.

The at least one optical amplifier may operate the control plane in a reduced fashion from the plurality of network elements; and the reduced fashion may include the at least one optical amplifier operating a reduced control plane protocol stack. The reduced fashion may include the at least one optical amplifier avoiding direct peering in the control plane. The network may include a plurality of terminal or reconfigurable optical add drop multiplexers communicatively coupled to the plurality of network elements; wherein the plurality of terminal or reconfigurable optical add drop multiplexers each comprise a link management task configured to collect the photonic layer data for optical amplifiers communicatively coupled thereto. The reduced fashion may include the plurality of network elements participating in flooding of routing information with the at least one optical amplifier participating in sharing the routing information with the plurality of terminal or reconfigurable optical add drop multiplexers communicatively coupled thereto. Each of the at least one of the plurality of links may include an Optical Multiplex Section with Optical Transmission Sections between optical amplifiers. The photonic link discovery task may be configured to discover photonic layer data for each associated Optical Transmission Section, and the link management task may be configured to initiate the discovery of the photonic layer data for each associated Optical Transmission Section and process the photonic layer data for each associated Optical Transmission Section. The photonic link discovery task may be configured to operate an append and forward configuration which appends current photonic layer data in an ordered relationship with previously added photonic layer data such that the link management task receives a list of the photonic layer data in the ordered relationship.

The plurality of terminal or reconfigurable optical add drop multiplexers may be configured to forward the photonic layer data for an associated Optical Multiplex Section via the control plane. The network may include a path computation element associated with the control plane, the path computation element configured to receive the photonic layer data; wherein the path computation element may be configured to utilize the photonic layer data as a constraint in path computation. The network may include one of a network planning system and a management system communicatively coupled to any of the path computation element or one of the plurality of network elements, the network planning system or the management system configured to receive the photonic layer data; wherein the one of the network planning system and the management system is configured to utilize the photonic layer data as a constraint in path computation. Local add and drop links of the plurality of terminal or reconfigurable optical add drop multiplexers may include Optical Multiplex Sections that are included in the photonic layer data.

In another exemplary embodiment, a method includes operating a control plane in a network including a first node communicatively coupled to a second node through a photonic link; operating at least one optical amplifier on the photonic link; determining photonic link data of the photonic link using the at least one optical amplifier; and providing topology messages through the control plane, the topology messages comprising the photonic link data, wherein the topology messages are sent between the second node, the first node, and a plurality of additional nodes with minimal participation of the at least one optical amplifier. The method may include initiating a message at the first node, the message comprising photonic link data associated with the first node; transmitting the message to the one or more optical amplifiers from the first node; at each of the at least one optical amplifier, appending photonic link data associated with each particular optical amplifier in an ordered manner; and receiving the message at the second node with the photonic link data for the photonic link. The method may include, at the second node, communicating the photonic link data for the photonic link via the control plane.

In yet another exemplary embodiment, an optical amplifier controller includes a communication interface communicatively coupled to a plurality of components; memory; and a processor, the communication interface, the memory, and the processor are communicatively coupled therebetween; wherein the processor is configured to: provide operations, administration, maintenance, and provisioning functions for the plurality of components; discover link data associated with a photonic link communicatively coupled to one or more of the plurality of components; process link discovery messages and add the discovered link data thereto; communicate the link discovery messages to a distributed control plane for use therein while minimally participating in direct peering in the distributed control plane.

BRIEF DESCRIPTION OF THE DRAWINGS

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

Figure 1:
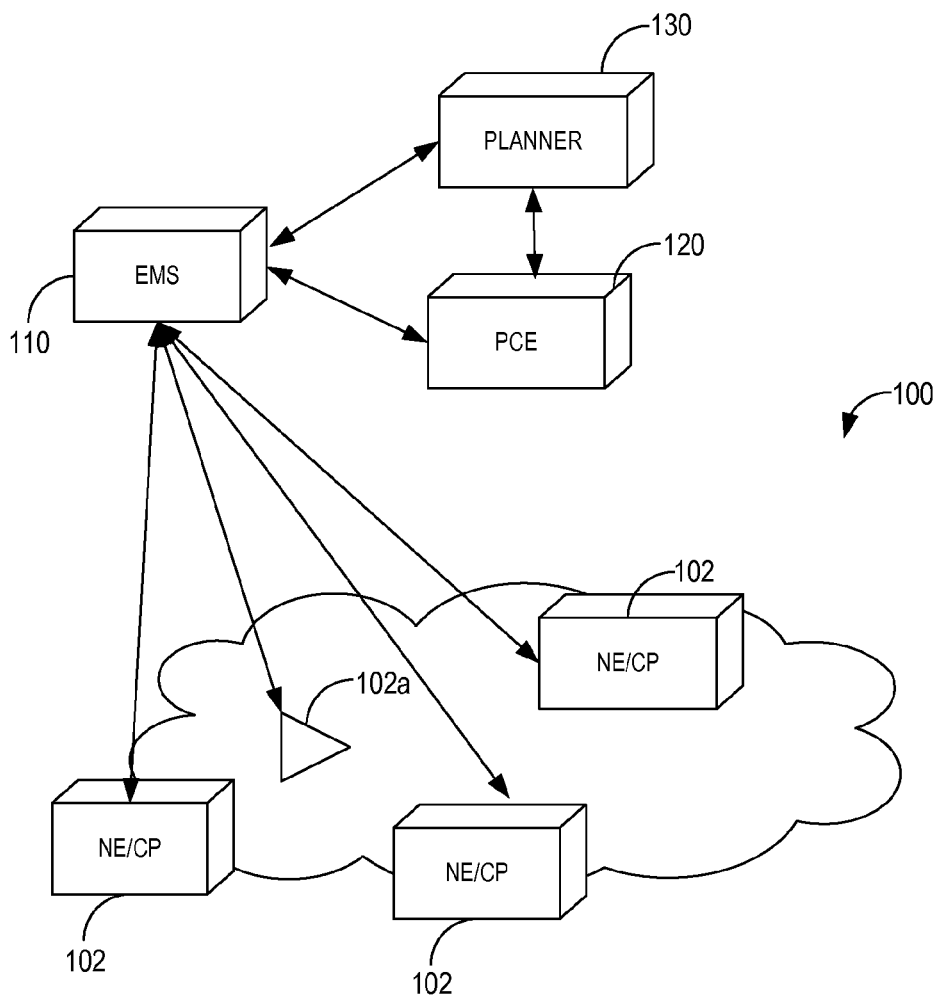
FIG. 1 is a network diagram of a network with a plurality of interconnected network elements operating a control plane therebetween.

In various exemplary embodiments, the present disclosure relates to photonic link information collection and advertisement systems and methods that enable photonic nodes (e.g., optical amplifiers) to operate within a control plane system in a distributed and real-time manner. In an exemplary embodiment, the systems and methods provide a distributed discovery method for OMS and OTS links without placing a full control plane protocol stack at each amplifier. Advantageously, the systems and methods minimize processor and memory requirements at optical amplifiers when compared to a conventional GMPLS approach or the like enabling low cost amplifiers that can participate in a control plane enabled network. This distributed discovery method for OMS and OTS links reduces the number of network elements that must participate in the flooding of routing information to only the OMS terminating locations, i.e. switching locations. This allows the network control plane to scale to a greater size when compared to a conventional GMPLS approach. This is important in a photonic network, where there may be large number of small terminal and Reconfigurable Optical Add/Drop Multiplexer (ROADM) nodes. Depending on network architecture, the number of control plane enabled nodes in this network may be lowered by orders of magnitude, greatly improving control plane scalability.

Additionally, the distributed discovery method for OMS and OTS links lowers topology advertising traffic considerably. Discovered OTS links are advertised only by OMS terminating nodes, not by each optical amplifier node that terminates on an OTS, as would be the case with conventional approaches. This is important as a method to minimize the amount of bandwidth that needs to be shared across a control plane signaling network. The distributed network discovery method for OMS and OTS links clearly understands the multi-layer relationship between OMS, OTS, and physical fiber. For example, in a single sequence, the discovery process collects information of multiple network layers (fiber, OTS, OMS). This provides accurate, hierarchical shared link risk information in addition to the topological neighbor information enabled by a conventional approach. Importantly, this provides a means to collect accurate information about client—server relationships which can be used as input to multi-layer planning and path computation functions (e.g. such as is possible on a PCE).

In another exemplary embodiment, the systems and methods include network databases with amplifier configuration information in a control plane enabled network. The distributed network discovery method for OMS, OTS, and fiber links also discovers photonic layer attributes for these layers (such as amplifier type, fiber types, amplifier gains settings, power levels, etc). Use of these photonic attributes as inputs to network level algorithms aid in accurate path computation of photonic reach for each wavelength in addition to traditional shortest or constrained path methods. This is an important building block for a photonic network that operates without any involvement of management system. For example, a node or PCE can fully compute a path and its associated wavelength reach based on distributed real-time input. Specifically, the network databases may include amplifier configuration information in addition to simple topological data. This data may be applied to distributed or centralized path computation schemes to provide accurate and optimized performance estimates.

Referring to FIG. 1, in an exemplary conventional embodiment, a network 100 is illustrated with a plurality of interconnected network elements 102 operating a control plane (CP) therebetween. The network elements 102 may include any type of network element, such as, for example, optical switches, cross-connects, multi-service provisioning platforms, packet switches, optical amplifiers, etc. Additionally, the network 100 is illustrated with an optical amplifier network element 102a. The network elements 102 are interconnect through various links (not shown) and operate the control plane for establishment of services on the network 100. Collectively, the network elements 102 may be communicatively coupled to an element management system (EMS) 110 which may be communicatively coupled to a PCE 120 and a network planning system 130. The network planning system 130 may be communicatively coupled to the PCE 120. The EMS 110 is generally a server or server cluster providing network operators access to network level and network element level operations, administration, maintenance, and provisioning (OAM&P) data and functions. For example, the EMS 110 may include a graphical user interface (GUI) for assisting in providing these functions. The PCE 120 may be part of the EMS 110, a separate device, part of one of the network elements 102, or the like.

The PCE 120, as defined by the Internet Engineering Task Force (IETF) in RFC 4655, "A Path Computation Element (PCE)-Based Architecture" (August 2006), the contents of which are incorporated by reference herein, may be an entity (component, application, or network node) that is capable of computing a network path or route based on a network graph and applying computational constraints. For the systems and methods described herein, the PCE 120 may be utilized to compute photonic paths for Layer 0, 1, 2, and/or 3 traffic. For example, Layer 0 may include a photonic layer (e.g., dense wave division multiplexing (DWDM)), Layer 1 may include Synchronous Optical Network (SONET), Synchronous Digital Hierarchy (SDH), Optical Transport Network (OTN), etc., Layer 2 may include Ethernet, and Layer 3 may include Internet Protocol (IP). The network planning system 130 may also be a server or cluster of servers, and optionally may be part of the EMS 110. The network planning system 130 provides the network operator a mechanism to plan for traffic growth on the network 100.

As described herein, in the context of photonic networks, the control plane and more particularly the PCE 120 requires additional data from the network elements 102 for establishment of photonic links. In the context of a traditional network with the control plane, e.g. ASON, GMPLS, etc., typically only the switching nodes of the network elements 102 are required for the PCE 120 to determine a route assuming existing photonic links exist for the route. If the PCE 120 is required to determine photonic routes, the PCE 120 must consider additional constraints in setting up new photonic links between the network elements 102. The additional constraints may include distance, attenuation, dispersion (both chromatic and polarization mode), wavelength assignments, non-linear effects, and the like. Thus, in the conventional network 100, the PCE 120 requires control plane functionality through to each of the network elements 102 including the optical amplifier network elements 102a such that the PCE 120 can obtain topology information and the like from the optical amplifiers for determination of photonic links. As described herein, the network 100 requires the EMS 110, the PCE 120, and/or the network planning system 130 to perform centralized data collection from the network elements 102, including optical amplifier network elements 102a which significantly outnumber other types of network elements.

Figure 2:
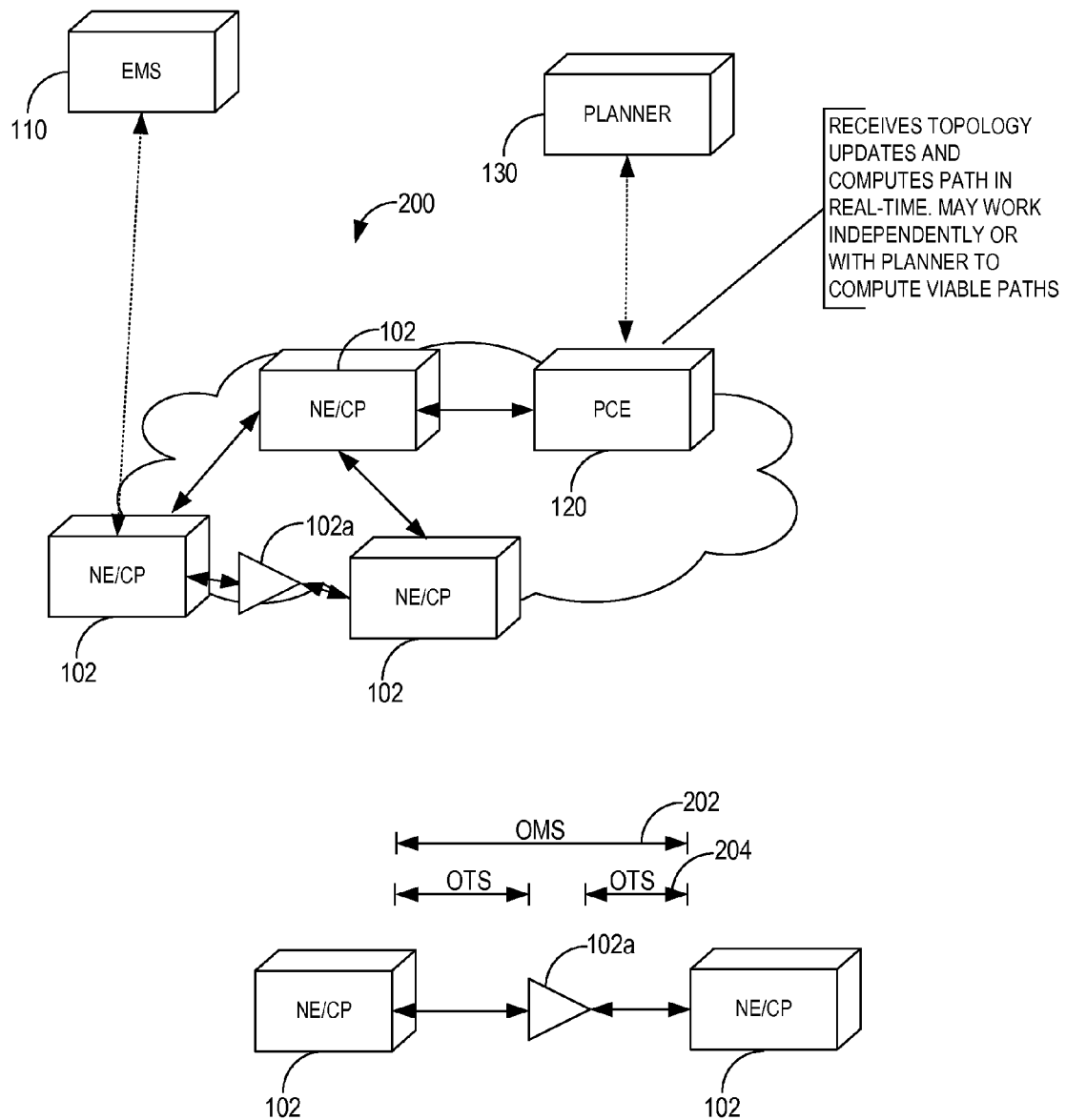
FIG. 2 is a network diagram of a network with a plurality of interconnected network elements operating a control plane therebetween along with photonic layer discovery systems and methods.

Referring to FIG. 2, in an exemplary embodiment, a network 200 is illustrated of a plurality of interconnected network elements 102 operating a control plane therebetween along with photonic layer discovery systems and methods. The photonic layer discovery systems and methods define a distributed way of discovering neighboring network elements for both OTS 202 and OMS 204 layers and the collection of detailed information from all of the optical amplifiers on each photonic link. The information is collected by the network elements 102 on both ends of an OMS 204 link and advertised throughout network along with other topological link information. Collected topological information is processed by any of the network elements 102 or a designated PCE. NEs or PCEs in the network use this detailed information to compute photonic routes, compute photonic path viability tables and make information available to the EMS or network planning system. In an exemplary embodiment, the optical amplifier network elements are removed from direct peering with other network elements 102 with respect to the control plane. For example, the systems and methods removes non-switching optical network elements such as optical amplifiers from direct GMPLS peering. Advantageously, the photonic layer discovery systems and methods enable improved network scaling performance over traditional methods and minimizes processor and memory requirements on the non-switching optical elements, i.e. the optical amplifiers 102a.

In an exemplary embodiment, the network 200 includes the photonic layer discovery systems and methods. In particular, the photonic layer discovery systems and methods include network databases at the network elements 102 with optical amplifier configuration information from a plurality of optical amplifier network elements 102a in addition to topology data. This data may be applied to distributed or centralized path computation schemes to provide accurate and optimized performance estimates. Further, the optical amplifier network elements 102a do not participate fully in network-wide control plane operations, i.e. the network elements 102a do not include full control plane protocol stacks, do not participate in peering and messages with all other nodes, etc. Instead, the network elements 102a communicate with link management task modules operating at the network elements 102 for purposes of providing the optical amplifier configuration information. As noted before, the optical amplifier configuration information is typically fixed or changes much slower or at a slower rate than topology data associated with the network elements 102 (located at either end of the link), i.e. switching elements. As such, there is no need for the optical amplifier network elements 102a to be full participants in the control plane. In an exemplary embodiment, the optical amplifier network elements 102a minimally participate in the control plane only through communication with the link management task modules operating at the network elements 102, and not full participation in control plane messages between the network elements 102.

The photonic layer discovery systems and methods provide a streamlined fashion for the network elements 102 to gather the associated optical amplifier configuration information and to communicate it between other network elements 102 using standard control plane topology messages. Accordingly, each of the network elements 102 and the PCE 120 may be configured with a network database which in addition to topology information includes the optical amplifier configuration information of the optical amplifier network elements 102a. Further, using standard control plane operations, the optical amplifier configuration information only needs to be rebroadcast upon changes in configurations, etc. which as stated above occur with less frequency than the switching nodes. Thus, the photonic layer discovery systems and methods enables topology updates which include optical amplifier and associated link data without requiring the network elements 102a to be full control plane participants. The photonic layer discovery systems and methods enables each of the full control plane participants, i.e. the network elements 102, to have full visibility of the optical amplifier and associated link data for computation of viable paths using this additional photonic layer data. The PCE 120 may include a network database and be communicatively coupled such that it receives the topology updates for the optical amplifier and associated link data for computation of viable paths.

Figure 3:
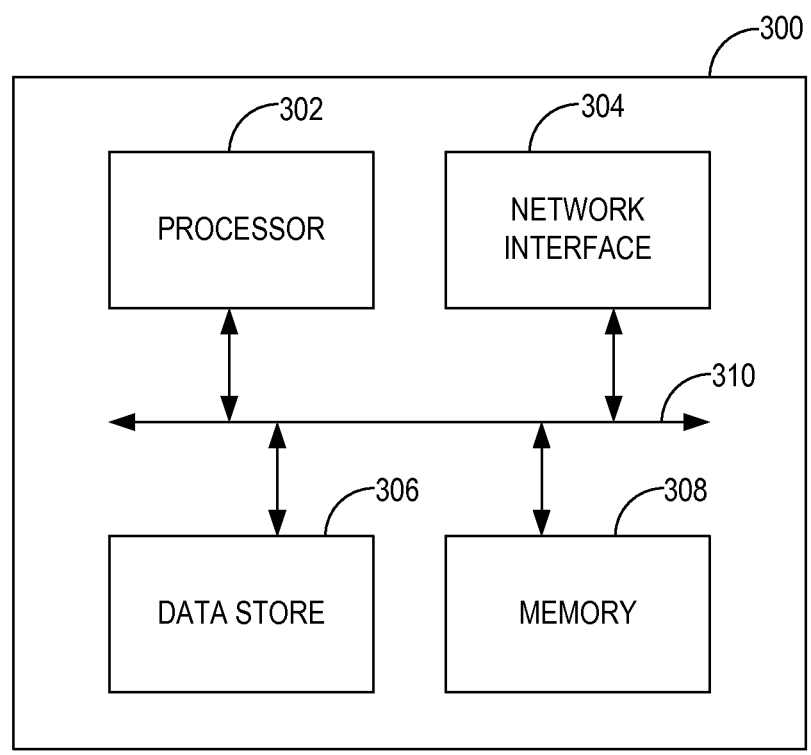
FIG. 3 is a block diagram of a controller configured to provide control plane processing at network elements and at optical amplifier network elements.

Referring to FIG. 3, in an exemplary embodiment, a controller 300 is illustrated to provide control plane processing at the network elements 102 and at the optical amplifier network elements 102a. In general, the controller 300 is configured to support OAM&P functions of a particular network element 102, 102a. The controller 300 is further configured to provide control plane functionality such as OSRP, ASON, GMPLS, MPLS, and the like as described herein. The controller 300 may be part of common equipment of the network element 102, 102a. For example, the controller 300 is communicatively coupled to components, line cards, modules, etc. associated with the network element 102, 102a. The controller 300 may include a processor 302, a network interface 304, a data store 306, and memory 308, each of which is communicatively coupled therebetween through a local interface 310. The processor 302 may be a hardware device for executing software instructions such as operating the control plane, OAM&P functions, etc. The processor 302 may be any custom made or commercially available processor, a central processing unit (CPU), an auxiliary processor among several processors associated with the controller 300, a semiconductor-based microprocessor (in the form of a microchip or chip set), or generally any device for executing software instructions. When the controller 300 is in operation, the processor 302 is configured to execute software stored within memory, to communicate data to and from the memory 308, and to generally control operations of the controller 300 pursuant to the software instructions.

The network interface 304 may be used to enable the controller 300 to communicate on a network, such as to communicate control plane information to other controllers 300, to the management system, and the like. The network interface 304 may include, for example, an Ethernet card (e.g., 10BaseT, Fast Ethernet, Gigabit Ethernet) or a wireless local area network (WLAN) card (e.g., 802.11a/b/g). The network interface 304 may include address, control, and/or data connections to enable appropriate communications on the network. The data store 306 may be used to store data, such as control plane information received via topology updates, provisioning data, OAM&P data, etc. The data store 306 may include any of volatile memory elements (e.g., random access memory (RAM, such as DRAM, SRAM, SDRAM, and the like)), nonvolatile memory elements (e.g., ROM, hard drive, DVD, and the like), and combinations thereof. Moreover, the data store 306 may incorporate electronic, magnetic, optical, and/or other types of storage media. The memory 308 may include any of volatile memory elements (e.g., random access memory (RAM, such as DRAM, SRAM, SDRAM, etc.)), nonvolatile memory elements (e.g., ROM, hard drive, DVD, etc.), and combinations thereof. Moreover, the memory 308 may incorporate electronic, magnetic, optical, and/or other types of storage media. Note that the memory 308 may have a distributed architecture, where various components are situated remotely from one another, but may be accessed by the processor 302.

In an exemplary embodiment, the controller 300 is configured to execute a full control plane protocol stack when the controller 300 is equipped in the network elements 102. Further, the controller 300 is configured to execute a reduced control plane protocol stack when the controller 300 is equipped in the optical amplifier network elements 102a. Generally, a control plane includes software, processes, algorithms, etc. that control configurable features of a network, such as automating discovery of network elements, capacity on the links, port availability on the network elements, connectivity between ports; dissemination of topology and bandwidth information between the network elements; calculation and creation of paths for connections; network level protection and restoration; and the like. The controller 300 in the network elements 102 is configured to operate full control plane functionality whereas the controller 300 in the optical amplifier network elements 102a is configured to provide reduced functionality focused on photonic link discovery. For example, the optical amplifier network elements 102a are reduced functionality elements from a control plane perspective since these network elements 102a do not participate in switching signals and the like. The systems and methods described herein utilize the inherent functionality of the network elements 102a to remove them as full control plane participants while providing a reduced protocol stack which supports full photonic layer discovery. Thus, the control plane as a whole maintains full distributed data collection while significantly reducing the number of elements participating in the full control plane.

The controller 300 may utilize control plane mechanisms to maintain a network database in real-time. For example, HELLO messages can be used to discover and verify neighboring ports, nodes, protection bundles, boundary links, and the like. The systems and methods described herein may utilize similar messages to discover and update photonic link information by the network elements 102a such that the network database includes full photonic layer information while not requiring full participation of the network elements 102a in the control plane. Also, the controller 300 may share topology state messages to exchange information to maintain identical data with other controllers 300. The controller 300 may be utilized to advertise topology information, capacity availability, provide connection management (provisioning and restoration), and photonic link information. For example, each link in a network may have various attributes associated with it such as, for example, line protection, available capacity, total capacity, administrative weight, protection bundle identification, delay, designation of boundary link, and the like. Further, each link may also have photonic attributes such as distance, fiber type, wavelengths provisioned/available, signal quality, dispersion amount, and the like that may be shared via the systems and methods described herein. Advantageously, the control plane may be configured to provide automated end-to-end provisioning. For example, a route for a connection may be computed from originating node to terminating node and optimized using Dijkstra's Algorithm, i.e. shortest path from source to a destination based on the least administrative cost or weight, subject to a set of user-defined constraints.

Further, the controller 300 is configured to communicate to other controllers 300 in other network elements 102, 102a on the network. Note, the network elements 102 communicate therebetween using OTN, SONET, SDH, etc. and here the controllers may communicate either in-band or out-of-band between the network elements 102. For SONET networks and similarly for SDH networks, the controllers 300 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the controllers 300 may use an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. For example, GCC0, GCC1, GCC2 or GCC1+2 may be used for in-band signaling or routing to carry control plane traffic. Based on the intermediate equipment's termination layer, different bytes may be used to carry control plane traffic. If the ODU layer has faults, it has been ensured not to disrupt the GCC1 and GCC2 overhead bytes and thus achieving the proper delivery control plane packets.

The optical amplifier network elements 102a do not generally terminate overhead associated with digital frames of OTN, SONET, SDH, etc. and as such require a separate communication mechanism to communicate with one another and with the network elements 102. In an exemplary embodiment, the controllers 300 in the network elements 102a may communicate using an optical service channel or optical supervisory channel (OSC). The OSC may be a point-to-point wavelength between network elements 102, 102a solely for carrying OAM&P data and control plane data. For example, ITU-T G.692, "Optical interfaces for multichannel systems with optical amplifiers," (October 1998), the contents of which are incorporated by reference herein, defines an exemplary OSC system. Also, ITU-T G.709 defines the OTS (Optical Transport Section) or OMS (Optical Multiplex Section) overhead within OTN's OTM (Optical Transport Module) Overhead Signal (OOS). In an exemplary embodiment, the OSC may be a wavelength out of the wavelength range for the network, e.g. 1510 nm, 1625 nm, 1310 nm, etc. In another exemplary embodiment, the OSC may be a modulated signal on the signal carrying wavelengths such as through pilot tone modulation and the like. Alternatively to the OSC, the network elements 102a may also use an overlaid Internet Protocol (IP) network such as, for example, User Datagram Protocol (UDP) over IP.

Figure 4:
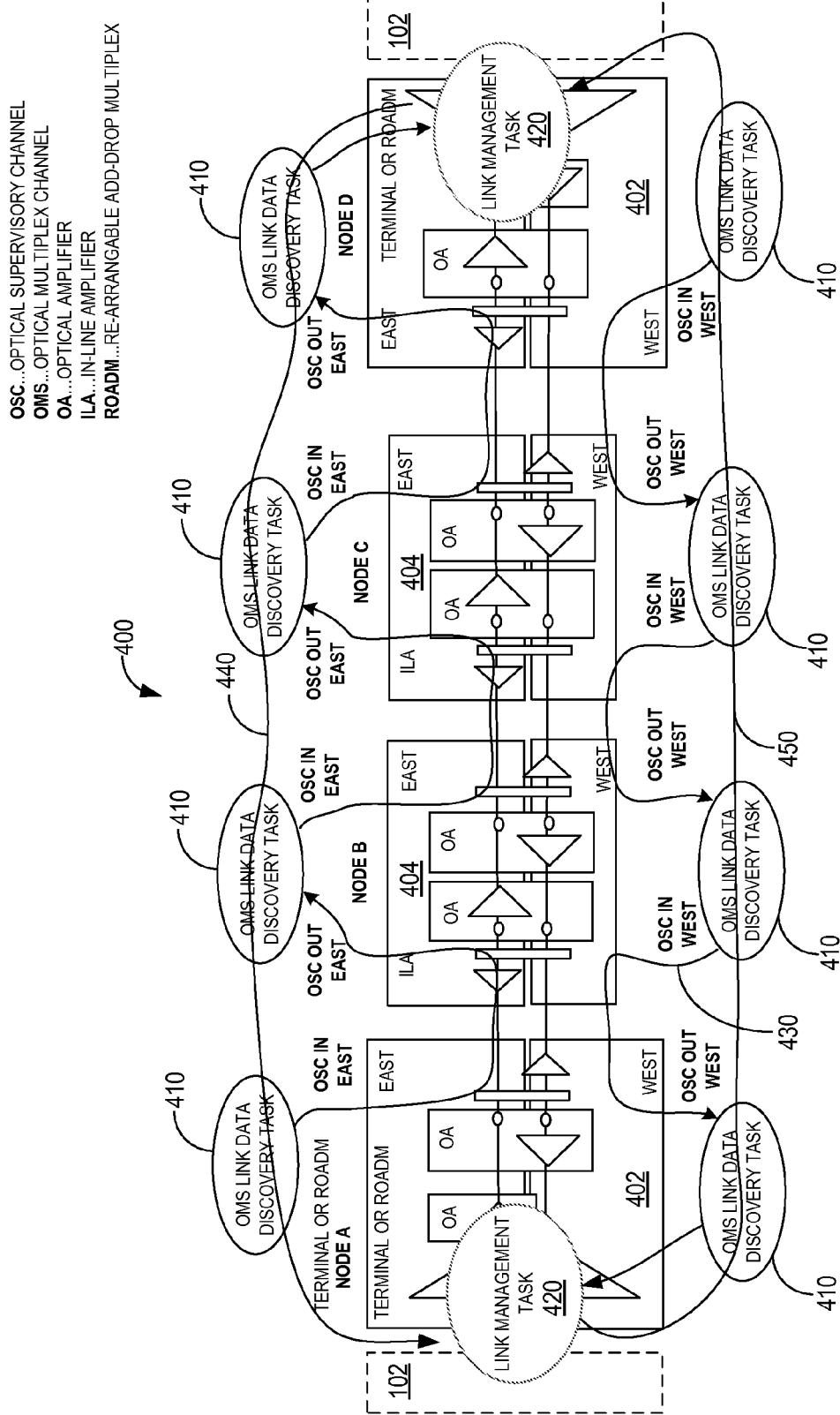
FIG. 4 is a network diagram of a network illustrating hop-by-hop topological link discovery and status update using the photonic layer discovery systems and methods.

Referring to FIG. 4, in an exemplary embodiment, a network diagram of a network 400 illustrates hop-by-hop topological link discovery and status update using the photonic layer discovery systems and methods. In particular, the network 400 illustrates a pair of fibers ("East" and "West") two network elements 102 with optical network elements 402, 404 interconnecting two network elements 102. The network elements 402 are OMS terminating elements, i.e. terminal or ROADM sites, and the network elements 404 are OTS terminating elements, i.e. in-line amplifiers. The network 400 includes a control plane in which the network elements 102 may include controllers 300 operating a full protocol stack whereas each of the network elements 402, 404 may include controllers operating a reduced protocol stack, i.e. minimally participating in the control plane. The reduced protocol stack generally is configured to communicate photonic layer data between the network elements 402, 404 with the network elements 404 communicating the photonic layer data to the network elements 102 for use in the control plane. Specifically, the network elements 404 (i.e., terminal or ROADM nodes) terminating an OMS layer topological link need to collect information from all amplifier nodes, i.e. the network elements 404, along the OMS link, in sequence of their location on the link. In an exemplary embodiment, the OSC may be used to communicate between neighboring network elements 402, 404. In an exemplary embodiment, each of the network elements 402, 404 is configured to operate an OMS link data discover task 410. Each of the network elements 404 is configured to operate a link management task 420 along with the OMS link data discover task 410. The tasks 410, 420 may be operated by the controller 300 for each of the network elements 402, 404.

In an exemplary embodiment, the OMS link data discover task 410 and the link management task 420 are the reduced protocol stack operating on the optical amplifier network elements 402, 404. Generally, the tasks 410, 420 are configured to provide topological updates for photonic links from the network elements 402, 404. The OMS link data discover task 410 is configured to provide OTS level photonic data such as optical amplifier configuration data, wavelength availability, wavelength provisioning data, optical amplifier operational data, photonic link data (e.g., fiber type, distance, dispersion, signal quality, etc.). That is, the OMS link data discover task 410 is configured to discover the OTS level photonic data initially and to discover any updates. As described herein, photonic data is expected to change at a much slower rate than other data (e.g. OTN, SONET, SDH, Ethernet, etc.). The link management task 420 is operated at the network element 404 for purposes of collecting and consolidating the OTS level photonic data for presentation to the network elements 102. Specifically, the link management task 420 is configured to collect the OTS level photonic data from the OMS link data discover task 410, and to present the collected OTS level photonic data as OMS level photonic data for an entire link. The OMS level photonic data is provided to the network elements 102, and the network elements 102 may advertise the OMS level photonic data in standard control plane messages. The tasks 410, 420 may communicate through the controllers 300 and their associated communication mechanisms as described herein. For example, using an OSC 430, each of the network elements 402, 404 are communicatively coupled therebetween. That is, the OSC 430 forms an connection east to west as inputs to each of the tasks 410. At the network elements 404, the tasks 410 are communicatively coupled to the tasks 420. Thus, the OSC 430 also enables the tasks 420 to be communicatively coupled via links 440, 450. In an exemplary embodiment, the network elements 404 are said to be minimally participating in the control plane with the implementation of the OMS link data discover task 410 to the link management task 420. That is, the network elements 404 have a reduced control plane protocol stack used for link discovery and management.

Figure 5:
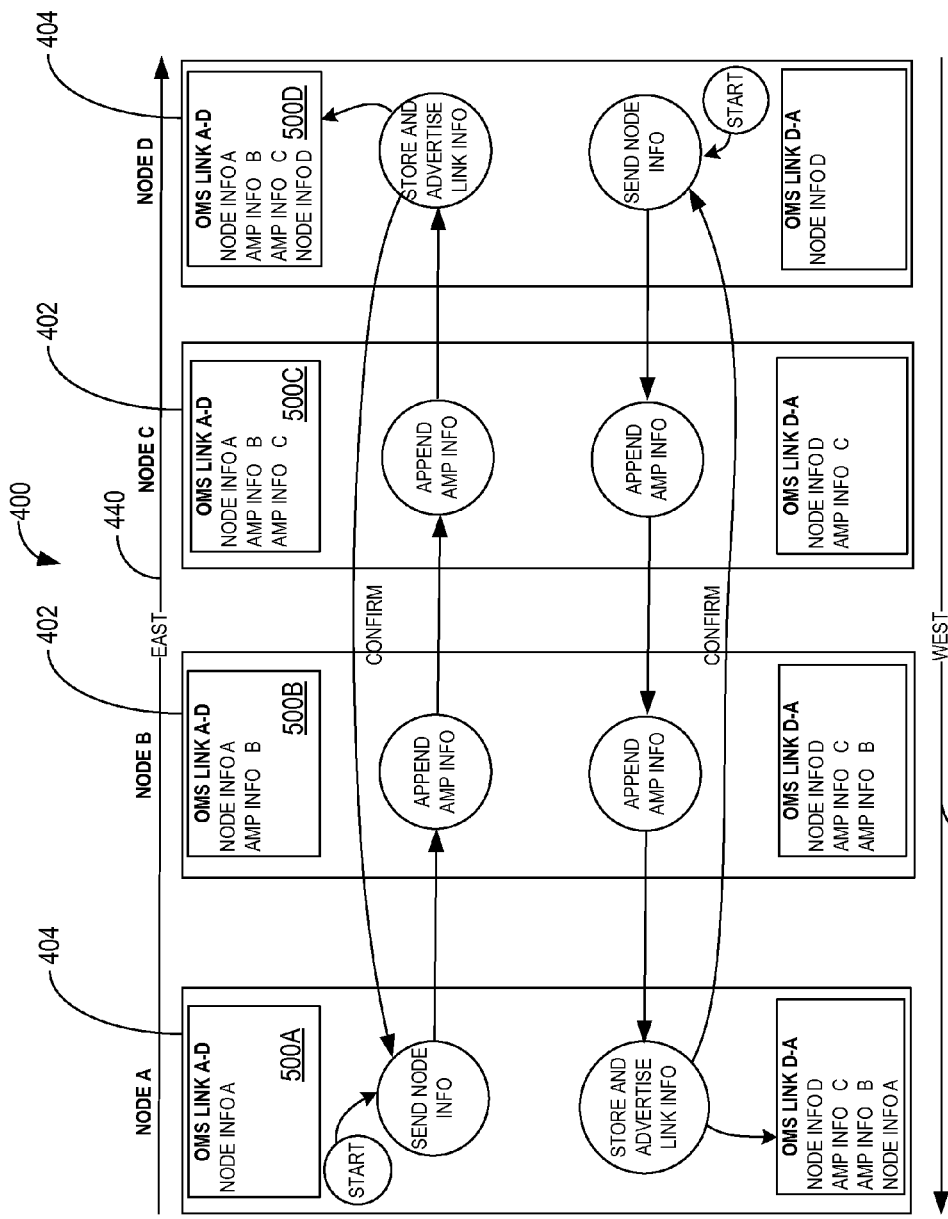
FIG. 5 is a flow diagram of the network of FIG. 4 illustrating hop-by-hop topological link discovery and status update using the photonic layer discovery systems and methods.

Referring to FIG. 5, in an exemplary embodiment, a flow diagram of the network 400 illustrates hop-by-hop topological link discovery and status update using the photonic layer discovery systems and methods. In particular, the flow diagram of FIG. 5 illustrates an exemplary operation of the OMS link data discover task 410 and the link management task 420 over the links 440, 450. As described with respect to FIG. 4, the network 400 includes two network elements 404 and two network elements 402. The network elements 404 may be referred to as Nodes A and D, and the network elements 402 may be referred to as Nodes B and C. The link 440 may be referred to as an OMS link A-D, i.e. eastbound, and the link 450 may be referred to as an OMS link D-A, i.e. westbound. The Nodes A and D each operate the OMS link data discover task 410 and the link management task 420, and the Nodes B and C each operate the OMS link data discover task 410. Each ROADM or terminal node, i.e. the network elements 404 which are Nodes A and D, terminate an OMS link, and for the photonic layer discovery systems and methods, these network elements 404 initiate a message on the egress side of the OSC. The message is received at next the physical node, on the ingress side of the OSC. If the node is an optical amplifier, i.e. the network element 404, the OMS link data discover task 410 determines detailed provisioning and monitoring information. The information is then appended to the message following the information received from the preceding node. This extended message is sent down the corresponding topological link supported by this optical amplifier, on the egress port. This process is repeated at each amplifier node between terminal nodes of this OMS link. That is, the process is terminated when the message arrives at one of the network elements 404. By the time the message arrives at the endpoint of the OMS link, it contains detailed information about each optical amplifier node in the order they are arranged on the link in the direction from which it arrived. The final terminal node receives information about the link, stores information in its database and sends updated link information to other nodes in the network.

In an exemplary operation and with reference to the link 440, the Node A initiates or starts a message 500. The initiation of the message 500 may be prompted based on an initial discovery, a manual request, an automatic request, a change in the network, etc. For example, the initiation of the message may be from one of the network elements 102 which is seeking to obtain photonic link information. At the Node A, the message 500 is populated with photonic link data associated with the Node A (denoted as a message 500A) and send to the Node B. The Node B populates the message 500B with its photonic link data such that Node B's data is ordered in relation with Node A's data and sends the message 500B to Node C. For example, this process may be referred to as append and forward to gather complete photonic layer information on the link 440. The Node C populates the message 500C with its photonic link data such that Node B's data is ordered in relation with Node A and Node B's data and sends the message 500C to Node D. Finally, at the Node D, the message 500D is received and the Node D adds its photonic link data, and the Node D stores and/or advertises the message 500D which includes all of the photonic link information for the link 440. The Node D may also send a confirmation message to the Node A of successful completion of the message 500D. Note, a similar operation may be performed on the link 450 between the Node D and the Node A. When exchange of the aggregated messages 500 between the nodes completes, the Nodes A and D at the opposite ends of the OMS links 440, 450 have a complete set of information from amplifiers in both directions of the links 440, 450. This information characterizes the OMS link from end to end. In addition to that, the information also characterizes each OTS link between amplifiers along the entire OMS link 440, 450.

In an exemplary embodiment, the link management task 420 is configured to initiate the photonic link information discovery and to process the finalized message with the complete set of information. The OMS link data discover task 410 is configured to perform the append and forward as well as data collection. Once the network elements 404 have the complete set of information, the link management task 420 is configured to store, advertise, and/or forward the complete set of information. In an exemplary embodiment, the network elements 404 may participate fully in the distributed control plane, and as such, the network elements 404 use link advertisement via the distributed control plane to inform other network elements or PCEs in the network about links visible to each network element. For example, the complete set of information may be provided in a topological update message such that each network element in the distributed control plane has this information. In another exemplary embodiment, the network element 404 may not fully participate in the distributed control plane. Here, for example, the network element 404 may be a photonic element for a terminal or ROADM with associated network elements 102 collocated that are full participants in the distributed control plane. In this exemplary embodiment, the link management task 420 may be configured to communicate with the associated network elements 102 to provide the complete set of information. Accordingly, the photonic link information discovery enables each network element 102 in the control plane to have full visibility of photonic link information at the OMS level while not requiring the network elements 402, 404 to be full participants in the control plane.

Figure 6:
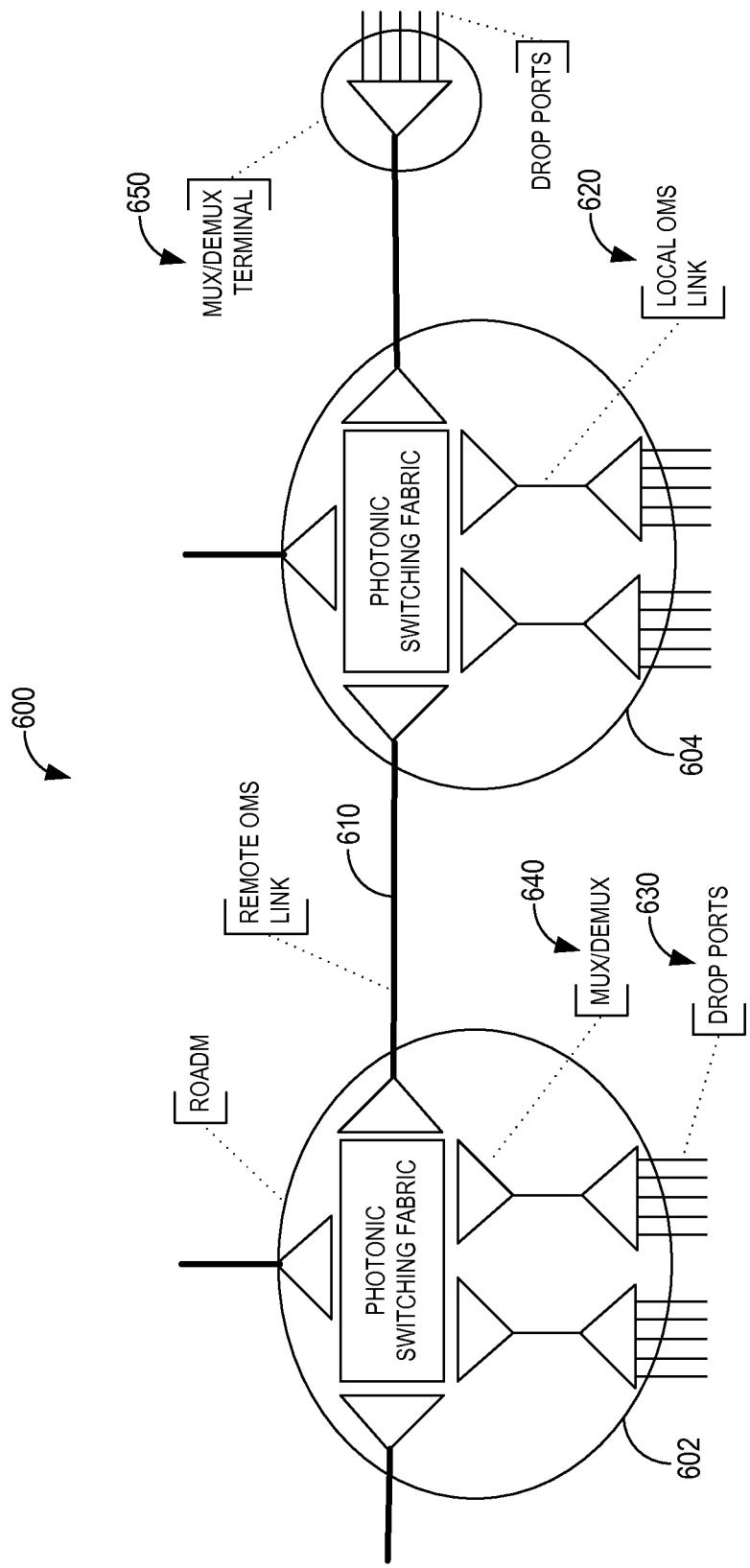
FIG. 6 is a network diagram of a network of two photonic switching nodes and various OMS links for the photonic layer discovery systems and methods.

Referring to FIG. 6, in an exemplary embodiment, a network diagram of a network 600 illustrates two photonic switching nodes 602, 604 and various OMS links for the photonic layer discovery systems and methods. In addition to providing OMS link information between neighboring network elements as described in FIGS. 4 and 5, the photonic layer discovery systems and methods may also extend to providing more detailed information. For example, the network 600 includes two photonic switching nodes 602, 604, i.e. a photonic switching node may be a ROADM. The nodes 602, 604 may be interconnected through a remote OMS link 610 over which the photonic layer discovery systems and methods may be utilized to collect photonic layer information. The network 600 may also include local OMS links 620, drop ports 630, multiplexer/demultiplexers 640, and multiplexer/demultiplexer terminals 650. In various exemplary embodiments, the photonic layer discovery systems and methods may be utilized to determine information associated with the various components 620, 630, 640, 650. For example, assuming the nodes 602, 604 are colorless directionless ROADMs, the drop side port banks may be treated as a unique degree over the local OMS links 620 with their own amplifiers and multiplexer/demultiplexers 640. Using the photonic layer discovery systems and methods, the nodes 602, 604 may advertise such configuration as a unique local topological link with relevant amplifier configuration data.

Thus, the photonic layer discovery systems and methods provide a distributed way of discovering neighboring network elements for both OTS and OMS layers and the collection of detailed information from all of the optical amplifiers on each photonic link. Additionally, the photonic layer discovery systems and methods may avoid requiring the optical amplifiers and other photonic elements to be full participants in the control plane. The photonic layer information is collected by network elements on both ends of an OMS link and advertised throughout network along with other topological link information. Collected topological information may processed by any network element or designated PCE. The NEs or PCEs in the network may use this detailed information to compute photonic routes, compute photonic path viability tables, and make information available to the EMS or network planning system.

In an exemplary embodiment, the network elements 102 may include a full control plane stacks in support of multiple network layers, such as photonic/L0, L1, L2, etc. Each of the network elements 102a would discover which layer(s) it is participating in and only communicate control plane data about that limited layer topology. Here, the network element 102 has a full loaded control plane stack that makes selective use thereof. In contrast, the network elements 102a, 404 are said to be minimally participating in the control plane whereby these network elements 102a, 404 minimally participate at their respective layer and only through communication in the tasks 410, 420. For example, a network may include SONET/SDH, OTN, WDM, etc. control plane capabilities at the same time and each port on a particular network element uses layers of the control plane as required. The network elements 102a, 404 only participate at the WDM layer, and here only for the tasks 410, 420. In an exemplary embodiment, each network element 102 fully participates at the WDM layer with other network elements 102 while the network elements 102a, 404 only participate at the WDM layer with adjacent network elements 102, i.e. not fully peered.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A network, comprising:
   a plurality of network elements operating a control plane via overhead;
   a plurality of links interconnecting the plurality of network elements; and
   at least one optical amplifier disposed on at least one of the plurality of links participating in the control plane in a reduced fashion from the plurality of network elements, wherein the at least one optical amplifier operates the control plane in the reduced fashion via a service channel such that the control plane operates on both the overhead between the plurality of network elements and on the service channel associated with the at least one optical amplifier;
   wherein each of the at least one optical amplifier is configured with a photonic link discovery task, the photonic link discovery task is configured to provide photonic layer data for the at least one optical amplifier and associated links to the control plane, and wherein the photonic layer data is advertised to all of the plurality of network elements via the control plane; and
   wherein the reduced fashion comprises the at least one optical amplifier operating a reduced control plane protocol stack for link discovery and management that floods routing information only to associated network elements of the plurality of network elements utilizing same control plane messages as the plurality of network elements.

2. The network of claim 1, further comprising:
   network databases at each of the plurality of network elements, wherein the network databases comprise amplifier configuration information received from the control plane in addition to topological data;
   wherein the amplifier configuration information is applied to path computation providing performance estimates of paths in the network.

3. The network of claim 1, wherein the photonic link discovery task is configured to collect information in a single sequence for a fiber, Optical Multiplex Sections, and Optical Transmission Sections for each of the at least one of the plurality of links.

4. The network of claim 3, wherein the information comprises hierarchical shared link risk information, and wherein the information is input to one of t planning system and a path computation system.

5. The network of claim 4, wherein the information comprises any of amplifier type, fiber types, amplifier gains settings, and power levels, and wherein the one of the planning system and the path computation system is configured to compute a path and associated wavelengths in the network based on the information.

6. The network of claim 1, wherein the reduced fashion comprises the at least one optical amplifier avoiding direct peering in the control plane.

7. The network of claim 1, further comprising:
a plurality of terminal or reconfigurable optical add drop multiplexers communicatively coupled to the plurality of network elements;
wherein the plurality of terminal or reconfigurable optical add drop multiplexers each comprise a link management task configured to collect the photonic layer data for optical amplifiers communicatively coupled thereto.

8. The network of claim 7, wherein the reduced fashion comprises the plurality of network elements participating in flooding of routing information with the at least one optical amplifier participating in sharing the routing information with the plurality of terminal or reconfigurable optical add drop multiplexers communicatively coupled thereto.

9. The network of claim 7, wherein each of the at least one of the plurality of links comprises an Optical Multiplex Section with Optical Transmission Sections between optical amplifiers.

10. The network of claim 8, wherein the photonic link discovery task is configured to discover photonic layer data for each associated Optical Transmission Section, and the link management task is configured to initiate the discovery of the photonic layer data for each associated Optical Transmission Section and process the photonic layer data for each associated Optical Transmission Section.

11. The network of claim 10, wherein the photonic link discovery task is configured to operate an append and forward configuration which appends current photonic layer data in an ordered relationship with previously added photonic layer data such that the link management task receives a list of the photonic layer data in the ordered relationship.

12. The network of claim 9, wherein the plurality of terminal or reconfigurable optical add drop multiplexers are configured to forward the photonic layer data for an associated Optical Multiplex Section via the control plane.

13. The network of claim 7, further comprising:
a path computation element associated with the control plane, the path computation element configured to receive the photonic layer data;
wherein the path computation element is configured to utilize the photonic layer data as a constraint in path computation.

14. The network of claim 13, further comprising:
one of a network planning system and a management system communicatively coupled to any of the path computation element or one of the plurality of network elements, the network planning system or the management system configured to receive the photonic layer data;
wherein the one of the network planning system and the management system is configured to utilize the photonic layer data as a constraint in path computation.

15. The network of claim 9, wherein local add and drop links of the plurality of terminal or reconfigurable optical add drop multiplexers comprise Optical Multiplex Sections that are included in the photonic layer data.

16. A method, comprising:
operating a control plane in a network comprising a first node communicatively coupled to a second node through a photonic link;
operating at least one optical amplifier on the photonic link in the control plane in a reduced fashion, wherein the control plane operates between the first node and the second node via overhead and between the at least one optical amplifier and the first node and the second node via a service channel;
determining photonic link data of the photonic link using the at least one optical amplifier; and
providing topology messages through the control plane, the topology messages comprising the photonic link data, wherein the topology messages are sent between the second node, the first node, and all additional nodes in the network with minimal participation of the at least one optical amplifier, and wherein each of the nodes comprise a photonic layer for each of the at least one optical amplifier in both directions of associated links;
wherein the reduced fashion comprises the at least one optical amplifier operating a reduced control plane protocol stack for link discovery and management that floods routing information only to the first node and the second node utilizing same control plane messages as the first node and the second node.

17. The method of claim 16, further comprising:
initiating a message at the first node, the message comprising photonic link data associated with the first node;
transmitting the message to the one or more optical amplifiers from the first node;
at each of the at least one optical amplifier, appending photonic link data associated with each particular optical amplifier in an ordered manner; and
receiving the message at the second node with the photonic link data for the photonic link.

18. The method of claim 16, further comprising:
at the second node, communicating the photonic link data for the photonic link via the control plane.

19. An optical amplifier controller, comprising:
a communication interface communicatively coupled to a plurality of components;
a memory; and
a processor, wherein the communication interface, the memory, and the processor are communicatively coupled;
wherein the processor is configured to:
provide operations, administration, maintenance, and provisioning functions for the plurality of components;
discover link data associated with a photonic link communicatively coupled2 to one or more of the plurality of components;
process link discovery messages and add the discovered link data;
communicate the link discovery messages to all network elements associated with a distributed control plane for use while minimally participating in direct peering in the distributed control plane; and
wherein each of the plurality of components comprise a photonic layer for each of at least one associated optical amplifier in both directions of associated links;
wherein the distributed control plane is operated over a service channel by the optical amplifier and over overhead by Optical Transmission Section terminating network elements;
wherein minimally participating comprises the optical amplifier controller operating a reduced control plane protocol stack for link discovery and management that floods routing information only to associated Optical Transmission Section terminating network elements utilizing same control plane messages as the network elements.

20. The network of claim 6, wherein, by avoiding the direct peering, the at least one optical amplifier do not participate in peering and control plane messages with all other network elements.

* * * * *